United States Patent

[11] 3,604,854

[72] Inventors Anton Christian Jacobaeus
Stockholm;
John Carl Harold Björk, Trangsund, both of, Sweden
[21] Appl. No. 875,475
[22] Filed Nov. 10, 1969
[45] Patented Sept. 14, 1971
[73] Assignee Telefonaktiebolaget LM Ericsson
Stockholm, Sweden
[32] Priority Dec. 13, 1968
[33] Sweden
[31] 17113/1968

[54] ARRANGEMENT AT A CALLED SUBSCRIBER'S INSTRUMENT FOR INDICATING THE CALLING INSTRUMENT
1 Claim, 2 Drawing Figs.

[52] U.S. Cl. .......... 179/5.5, 179/84 L
[51] Int. Cl. .......... H04m 15/06
[50] Field of Search .......... 179/5.5, 84, 84 L

[56] References Cited
UNITED STATES PATENTS

| | | | |
|---|---|---|---|
| 3,045,067 | 7/1962 | Nilsson et al. ................ | 179/5.5 |
| 3,472,968 | 10/1969 | Jacobaeus et al. ............ | 179/84 L X |

*Primary Examiner*—Kathleen H. Claffy
*Assistant Examiner*—William A. Helvestine
*Attorney*—Hane & Baxley

ABSTRACT: In an automatic telephone exchange certain subscribers can use short numbers instead of the directory numbers for calls to optionally selected extensions which often are called from the subscriber. The invention has for a purpose to indicate at the called subscriber's instrument who is calling or has called with the use of a short number. A registering means for short numbers is arranged at the subscriber's instrument. In the exchange identifying means and analyzer are arranged so that on one hand the identity of the called extension corresponding to a short number is indicated for connecting a telephone communication, on the other hand the short number of the calling subscriber valid at the called part is indicated for setting the registering means of the called subscriber's instrument.

INVENTORS

ANTON CHRISTIAN JACOBAEUS
JOHN CARL HAROLD BJÖRK

BY Hane Baxley
ATTORNEYS

ARRANGEMENT AT A CALLED SUBSCRIBER'S INSTRUMENT FOR INDICATING THE CALLING INSTRUMENT

This invention concerns automatic telephone systems within which certain subscribers can call a number of optionally selected other subscribers with the use of a reduced number of digits, i.e. a short number compared with the subscribers' directory numbers. The invention has for a purpose to indicate at the called subscriber's instrument who is calling or has called with the use of a short number.

It is known to use in a telephone system a particular number series having short, usually 1-digit or 2-digit numbers for calls from certain subscribers to such subscribers' numbers which are often called and according to the telephone directory have a multidigit number. It is also known to indicate the subscriber's number of the calling instrument when no answer is received, by means of impulse trains which are registered in a registering means arranged at the called subscriber's instrument. By that the whole number in question is transmitted to he register of the called subscriber's instrument. At calls made by dialling short numbers an almost analogous process could be used on condition that the short number intending a certain subscriber is the same for all instruments calling the subscriber with the use of a short number. This would however imply a great limitation of the possibilities of making calls with the use of short numbers. A memory is therefore allotted to each subscriber who wishes to use short numbers, for example a memory represented by an intermediate distribution frame, so designed that the combination of the identity of the calling subscriber, for example his directory number, and the used short number, indicates the identity of the directory number of the called subscriber.

It has not been found suitable to transmit the identity of the calling subscriber to a registering means of the called subscriber's instrument in form of a multidigit subscriber's number. On one hand the costs of the registering means for the digits become great, on the other hand the digit transmission requires embarrassingly long time.

The need of short numbers and the need of knowing who is called or has called are to a large extent coincident wants and the invention has for a purpose to take advantage thereof, difficulties however arising as to stating which short number is valid at the called subscriber's instrument for the calling subscriber. The invention removes said difficulty by means of an indicating means in the telephone exchange comprising an individual relay for each subscriber who is allowed to make use of short numbers which relay is operated, when the identity of the subscriber is indicated in connection with a call to a short number, and closes a circuit through a writing wire in an analyzer which wire on one hand corresponds to the short number, on the other hand is individual for the subscriber and which is passed through magnetic annular cores in the analyzer. Upon a pulse through the circuit the analyzer indicates on one hand the identity of the called extension for connecting a communication to the extension, on the other hand the short number of the calling subscriber for setting the registering means of the called extension.

The invention will be described more closely below with reference to the accompanying drawings.

Figure 1:
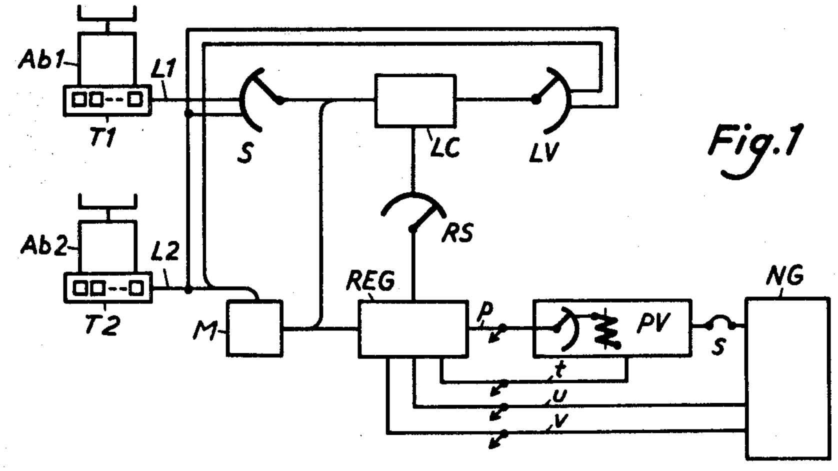
FIG. 1 shows a general diagram of a telephone system according to the invention.

In FIG. 1, Ab1 and Ab2 are subscribers' instruments each of which has been provided with a registering means designed as an instrument addition T1 and T2 respectively. Each instrument addition contains a voice-frequency signal receiver with filter circuits and amplifiers for a number of different voice frequencies and a signal indicator for each of said voice frequencies. By means of subscriber's lines L1 and L2 respectively, thesubscribers' instruments are connected to a telephone exchange comprising a line finder RS, speech links LC, line selectors LV and registers REG which by means of register finders RS can be connected to the links LC. A common marker M is used to control the selecting means S, LV and RS. In FIG. 1 are also shown an indicating means PV and an analyzer NG arranged commonly to the registers REG.

The signal transmission from Ab1 and Ab2 to the telephone exchange can take place by means of a dial and impulse trains or by means of pushbuttons.

Figure 2:
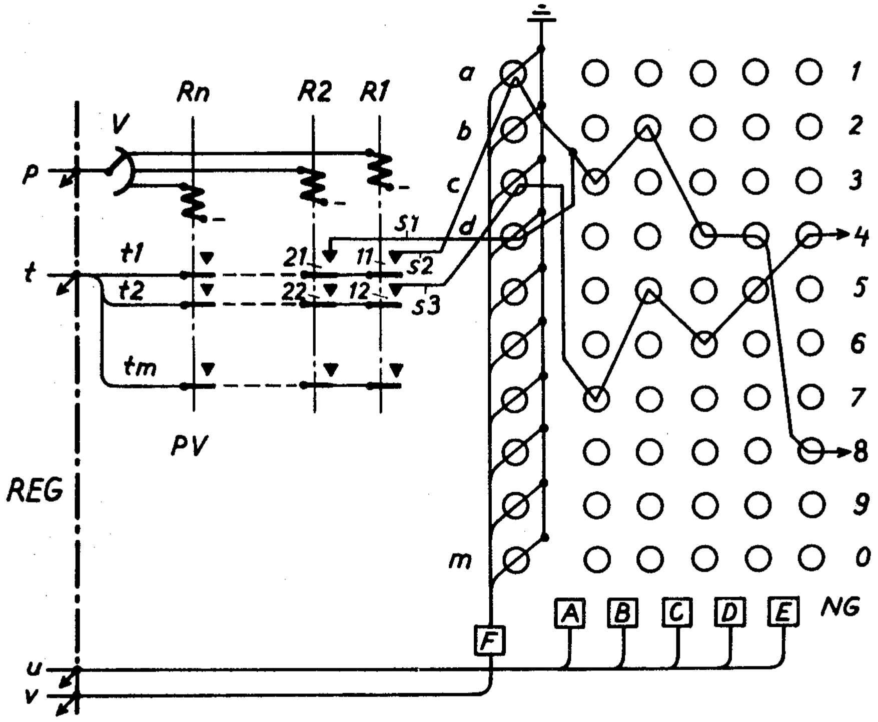
FIG. 2 shows the principle of the indicating means PV and the analyzer NG in FIG. 1.

In FIG. 2 an indicating means PV is shown, composed of a selector V, for example a relay selector, and a number of relays R1–Rn so that each subscriber who can use short numbers, has a relay of his own or at least a relay combination which is adjusted from the register REG with the aid of the identity of the calling subscriber's instrument. The indicating means PV is connected to an analyzer NG, built of magnetic annular cores, by means of writing wires s1–s3. The analyzer consists of a first part comprising annular cores *a,b,c,......m* where each annular core corresponds to a short number, and of a second part with five columns comprising each 10 annular cores where each column corresponds to one of the digits of a 5-digit subscriber's number. For the short numbers there is provided a reading means F and for each of the five columns there is a reading means A,B.......E.

In FIG. 2 the relay R1 with the contacts 11,12.... is assumed to belong to the subscriber's instrument Ab1 and the relay R2 with the contacts 21,22.... is assumed to belong to Ab2. The instrument Ab2 has a directory number 75–654 but can also be called from Ab1 by dialling the short number 2 preceded by a routing number. The instrument Ab1 can be called from Ab2 by using the short number 3 preceded by said routing number.

The registers are connected with the indicating means PV and the analyzer NG through bundles of wires *p,t,u,v*.

A call from the subscriber's instrument Ab1 is made by closing a circuit through the line L1. The call is marked in the marker M which selects a free link Lc and a free register REG and sets the corresponding line finders S and RS in such a way that a connection is obtained between Ab1 and REG. In connection with the call the identity of Ab1 or of L1 is stated and is registered in the register REG. The marker M is released and the calling subscriber hears a dialling tone sent out from REG. If then a common subscriber's number, for example the number of Ab2, is dialled on the dial or key set of Ab1, this number will be registered in REG and the register sets the line selector LV, for example by means of the marker M, so that a telephone connection is obtained between Ab1 and Ab2 through S, LC and LV. Then REG and RS will be released.

If on the contrary a short number is dialled at Ab1, for example the 1-digit number 2 preceded by a routing number, REG is connected to the indicating means PV and the analyzer NG. The selector V of the indicating means PV is set from REG with the aid of the identity of the calling instrument which according to the above is registered in REG. By means of a circuit passing through the wire P and the selector V, the relay R1 is operated which relay corresponds to the calling subscriber's instrument Ab1. The contacts 11–12 and others are actuated. Since the short number 2 has been registered in REG, a circuit will be closed through the wire *t*2, the contact 12, the wire s3, the annular core C, the annular cores 7,5,6,5 respectively four on the five columns of NG, corresponding to the sequential order of the digits. A pulse is sent through the circuit and activates the reading means F,A,B.....E, so that pulses are sent through wires of the bundle of wires *u* and *v* to the register REG which is set to register the short number 3 and the directory number 75– 654 of the called subscriber's instrument Ab2. Then PV and NG will be released.

The register REG then sets up a telephone connection between the subcriber's instruments Ab1 and Ab2 with the and of the subscriber's number 75–654. Before REG is released a voice-frequency signal is now sent through RS, LC, LV and the line L2 to the registering means T2 whereby the signal indicator corresponding to the short number 3 is released, Then ringing signals are sent out from LC in the ordinary manner. The calling subscriber can see, before he answers, who is calling, and if he cannot answer, the signal indicator remains in released position so that one may see who has called.

In FIG. 2 also those circuits are shown which arise when calling with the short number 1 from the instruments Ab1 and Ab2 to a subscriber having the directory number 32–448. The circuits pass through the wire t1, corresponding to the short number 1, the contact 11 and the wires s2 of Ab1 and 21 respectively s1 of Ab2, the annular core a of Ab1 and d of Ab2. Upon calls from Ab1 the digit 1 is marked and upon calls from Ab2 the digit 4 is marked at the called subscriber's instrument.

The invention is not limited to the embodiment described above. It is for example possible to make calls with the use of short numbers without using routing numbers if the subscriber's instruments are equipped with pushbuttons for digit dialling. The telephone exchange may be designed with delayed disconnection when making calls with the use of short numbers. Calls with a short number are made by pushing the pushbutton corresponding to the number before the hand microtelephone is lifted. The pressing of the pushbutton causes calls to the telephone exchange, call identification, connection of a register and registering of the first digit of the short number in the register immediately at the connection which indicates that a short number is indicated. If 1-digit short numbers are used, the called number can be indicated according to the description above immediately at the connection of the register without necessarily having to register the identified calling number in the register. A pause after the connection of the register before a digit signal is received proves that a call with a multidigit number is intended.

After a register has received a call, made with the use of a short number, the connecting process will be delayed until the digit signal ceases, and the hand microtelephone is lifted or until a certain time has elapsed.

We claim:

1. In an automatic telephone system, an exchange having a plurality of extensions each having a directory number and each comprising a subscriber's line and a subscriber's instrument; from at least certain of said instruments a number of optionally selected extensions being called with the use of short numbers having a reduced number of digits compared with the number of digits in said directory numbers; a registering means for each of at least some of said optionally selected extensions arranged at the subscriber's instrument; in said exchange a means stating, at least upon receipt of a short number, the identity of the calling subscriber's extension and an indicating means comprising an individual relay for each of said certain instruments, which relay is operated when the identity of the subscriber's instrument is indicated in connection with a short number; an analyzer composed of magnetic annular cores; a contact on said relay closing a circuit through a writing wire which corresponds to the short number and is individual for the calling instrument and is passed through magnetic annular cores in said analyzer; the analyzer upon pulse through said circuit indicating on one hand the identity of the called extension for connecting a telephone communication to the extension, on the other hand the short number of the calling subscriber for setting the registering means of the called extension with the help of signals through the called subscriber's line.